United States Patent [19]

Lawwill

[11] 3,868,627

[45] Feb. 25, 1975

[54] LAMINATED TONGUE FOR VEHICLE SEAT BELT BUCKLE SYSTEM

[75] Inventor: Ronald C. Lawwill, Birmingham, Mich.

[73] Assignee: Allied Chemical Corporation, New York, N.Y.

[22] Filed: Oct. 1, 1973

[21] Appl. No.: 402,653

[52] U.S. Cl. .......... 340/52 E, 340/278, 307/10 SB, 202/61.58 B, 180/82 C, 200/61.58 B
[51] Int. Cl. ............................................. B60r 21/10
[58] Field of Search ....... 340/52 E, 278; 307/10 SB; 180/82 C, 200/61.58 B

[56] References Cited
UNITED STATES PATENTS
2,880,789   4/1959   Leibinger .................... 200/61.58 B Primary Examiner—Alvin H. Waring
Attorney, Agent, or Firm—Jonathan Plaut

[57] ABSTRACT

A vehicle safety system comprising passenger restraint structure including a buckle with a laminated tongue, the tongue being electrically conductive in portions with other portions insulating the electrically conductive portions so that the electrical circuit is completed which negates warning indication and/or which controls inflation of an inflatable restraint, for example, when the tongue is latched in the buckle.

3 Claims, 6 Drawing Figures

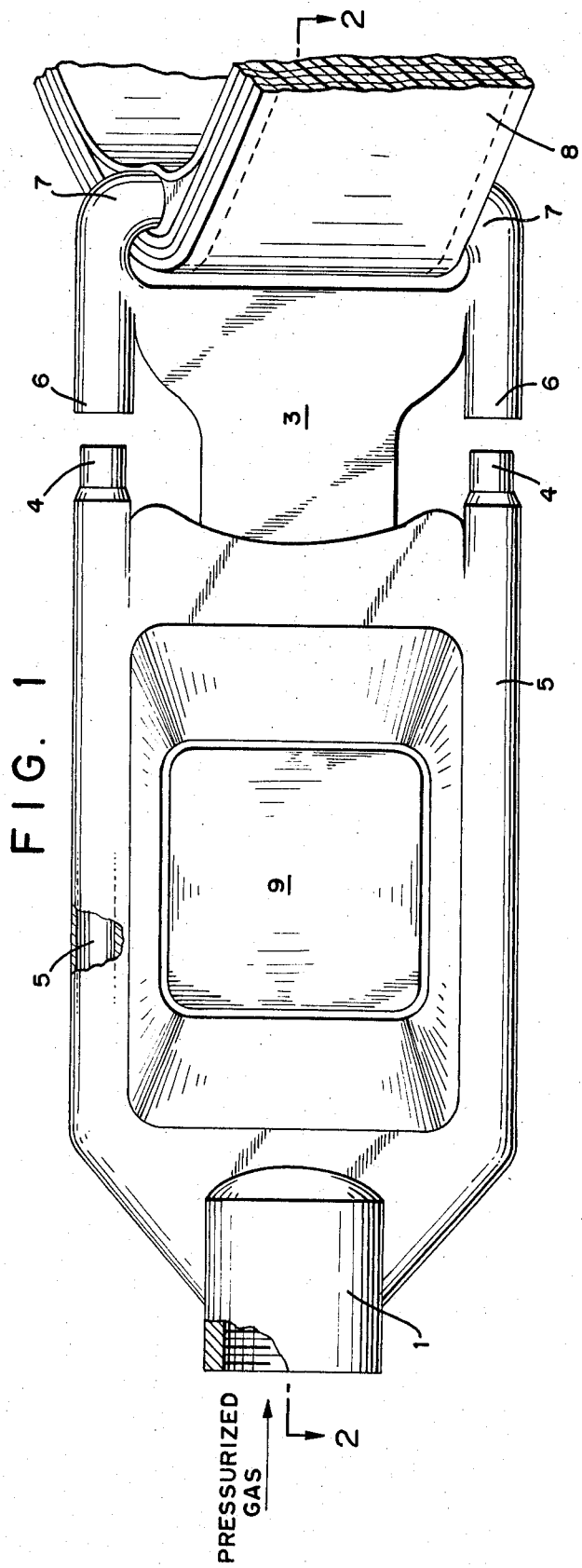
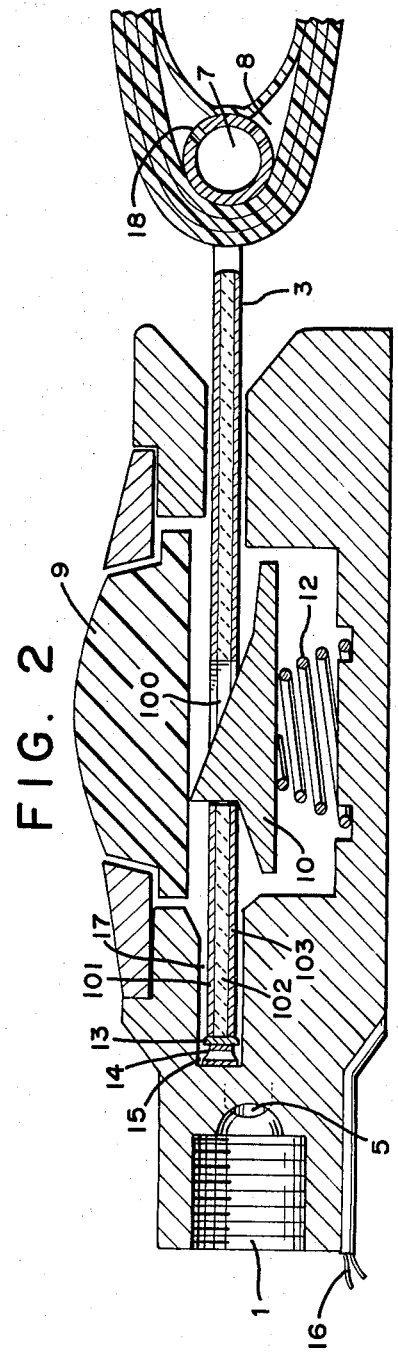

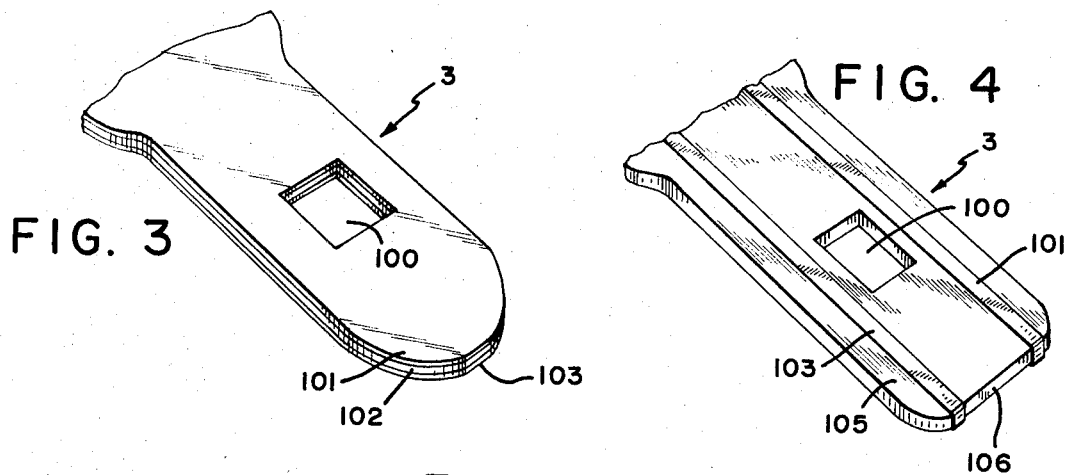
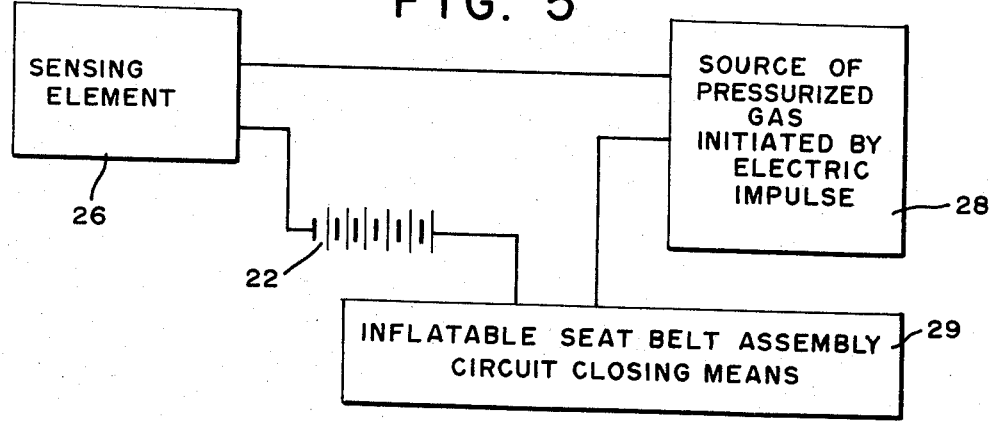
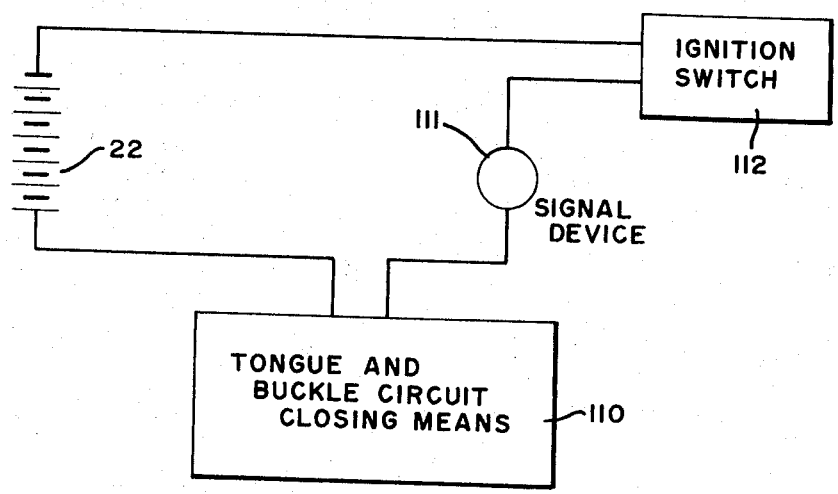

LAMINATED TONGUE FOR VEHICLE SEAT BELT BUCKLE SYSTEM

BACKGROUND OF THE INVENTION

1. Field of the Invention

This invention relates to vehicle safety system, and more particularly to restraints having a buckle and tongue, the buckle and tongue acting with the seat belt webbing structure or inflatable structure, for example, adapted to protect the wearer if the vehicle is involved in a collision.

2. Description of the Prior Art

In prior art restraints utilizing a tongue and buckle in combination with the restraint, it is known to locate a switch in the buckle which is motivated by latching of the tongue in the buckle to complete or interrupt an electrical circuit, as for example to open a switch in a circuit energizing a lamp and/or buzzer warning system, as described for example in copending patent application Ser. No. 297,137 filed Oct. 12, 1972, now U.S. Pat. No. 3,781,497, entitled "Buckle With Plunger Switch" of Robert L. Stephenson et al. Likewise it is known to include a switch in a buckle which is motivated by the tongue on latching in the buckle so as to complete a circuit which energizes a system for inflating an inflatable restraint on the occurrence of certain accident conditions, as described in copending patent application Ser. No. 310,284, filed Nov. 29, 1972, entitled "Vehicle Safety System" of Donald J. Lewis. In either case, the motivation of the switch depends on a mechanical switch which must be physically offset by the tongue as it moves to latched position in the buckle. This use of mechanical parts is expensive and can lead to mechanical problems which will inactivate the system.

SUMMARY OF THE INVENTION

The present invention is directed to a laminated tongue which is received within a buckle to complete a circuit when latched through the tongue itself for, for example, completing a circuit to deactivate a warning buzzer and/or light on seat belt usage and/or to complete a circuit energizing an inflatable restraint system.

More specifically the invention of this application is concerned with a switch comprising a buckle and a tongue; the buckle having a latch bar therein for locking the tongue in the buckle and a spring biased contact contacting an end of the tongue when the tongue is locked in the buckle. The tongue includes electrically conductive portions separated by an insulating portion, with the contact in the buckle contacting said electrically conductive portions when the tongue is locked in the buckle.

BRIEF DESCRIPTION OF THE DRAWINGS

FIG. 1 is an enlarged plan view of a preferred embodiment of my invention. In this embodiment the fastening device is a buckle attached to a source of pressurized gas, and a tongue, shown with a portion of an inflatable restraint attached, partially inserted into the buckle. One method of completing the circuit through the tongue is illustrated.

FIG. 2 is an enlarged cross-sectional view of the buckle and tongue of FIG. 1 taken along line 2—2.

FIG. 3 is one preferred embodiment of a laminated tongue according to applicant's invention.

FIG. 4 is a second embodiment of a laminated tongue according to applicant's invention.

FIG. 5 diagrammatically represents the electrical connections utilizing the FIG. 1 embodiment, that is between the sensing element which closes a portion of the circuit when subjected to selected conditions, such as those resulting from a collision, the source of pressurized gas which inflates the inflatable restraint when the circuit is complete, the source of electrical energy, and the inflatable restraint assembly which includes an electrical connection in the buckle which will be described hereafter. The electrical switch in the buckle must be in the closed position at the time the sensing element closes its portion of the circuit in order for the circuit to be complete. Only when the circuit is complete, will the pressurized gas be released to inflate the restraint.

FIG. 6 diagrammatically illustrates the electrical connections between the buckle with the laminated tongue and a signal light and/or buzzer.

DETAILED DESCRIPTION

In the vehicle safety system of one preferred embodiment of the present invention, there is a sensing device adapted to close an electric circuit in response to abnormal conditions which tend to violently displace a person from his seat in an automotive vehicle. A collision is representative of the type of abnormal condition to which such a sensing device responds by closing an electric circuit. In order that the sensing device may transmit an electrical impulse, it is connected with a source of electrical energy, preferably the service battery of the vehicle.

Also included in the circuit is an inflatable restraint assembly which includes a circuit-opening device or switch which is in the open position when the seat belt or harness is not fastened about a person, and in the closed position when fastened.

The circuit closing device is a switch associated with the buckle for securing the inflatable harness, for example, about an individual. Such a switch is in the open position when the buckle and associated tongue are in their unfastened or unlatched position, and in its closed position when the buckle and associated tongue are fastened, indicating that the inflatable harness is being worn. In one embodiment, the buckle has a source of pressurized gas connected thereto, the tongue is attached to the inflatable restraint, which along with the buckle is mounted in the vehicle.

Referring now to the drawings wherein like numerals indicate like or corresponding parts throughout the several views:

FIG. 1 is a plan view of a seat belt buckle and tongue. In this embodiment, numeral 1 is a threaded female connection to which a source of pressurized gas (as shown) is attached. On release of the gas it escapes through conduits 5, along the side or sides of the buckle. The tongue 3 is shown as partially inserted. When the tongue is fully inserted, nipples 4 of conduits 5 engage the female terminals 6 of conduits 7 in a substantially gas-tight relationship. Conduit 7 is sealed into inflatable restraint 8. The tongue and conduits can be readily disengaged by depressing push button 9. Of course, this arrangement is merely illustrative and is applicable to various types of buckles where release is to be had by lifting a lever or by other means.

FIG. 2 is a cross-section of the embodiment of FIG. 1 taken through line 2—2. In this drawing, the tongue 3 is in latched engagement within channel 17 of the buckle. It is held in place by latch bar 10, biased upwardly by spring 12. The tongue has depressed the latch spring 14 fixed in recesses 15 of the buckle and mounting the contact 13 which connects the conductive portions of the laminated tongue to complete the circuit, as will be discussed. The spring 14 serves advantageously to eject the tongue when it is unlatched. On completion of the circuit, the release of pressurized gas, as for example, by firing a squib which heats the gas and raises the pressure to burst a retaining rupture disc is possible. The gas may alternately be generated and released by the electrical discharge of a cartridge, thus the pressurized gas may be supplied from a pressure chamber, it may be supplied partly as gas, stored under pressure, and partly as gas generated by combustion, or it may be supplied entirely by combustion as by the firing of a cartridge. The gas enters connector 1, is conveyed along the sides of the buckle via conduits 5 which communicate with conduit 7, and is released through openings 18 into folded inflatable restraint 8 into which said conduit is sealed. The belt is thereby inflated.

The laminated tongue 3 shown in FIG. 3 includes an aperture 100 therein for reception of the locking latch bar 10. The laminated tongue is comprised of conducting material 101 and 103 separated by insulating material 102. The conducting material is connected so as to complete the circuit with the inflator as has been described and as will be further described as in relation to FIG. 5. The conducting material may be, for example, stainless steel, although the choice of the particular material is within the purview of one skilled in the art. The non-conductive material may be, for example, quartz or other ceramic material, although again the choice of that material is within the purview of one skilled in the art. When the laminated tongue is locked in position in the buckle 2 by the latch bar 10, the contact 13 is pressed by the end of the tongue against the latch spring 14 and completes the circuit between the conductive elements 101 and 103 so that the circuit for energizing the source of inflating gas is complete.

A second embodiment of a laminated tongue is shown in FIG. 4, in which the tongue 3 is formed with conductive strips 101 and 103 laminated on the tongue body 105. The conductive strips are separated by the tongue body 105, which is of an insulating material, so that the tongue functions in the same manner as described with relation to FIG. 3. In the embodiment of FIG. 4, the strips pass along the entire extent of the tongue and over a portion of the extending tip 106 thereof, so as to come in contact with the contact 13 when the tongue is fully inserted and locked by latch bar 10 (the extending tip of the tongue pushes against the contact 13 and the spring 14).

FIG. 5 is a diagrammatic representation of the circuit for the embodiment of FIG. 1 connecting the source of energy 22 which generally consists of a service battery with the sensing element 26, the initiator for the release or generation of the pressurized gas 28 and the inflatable restraint assembly circuit closing means 29. The latter represents the electric switch made up of the laminated tongue of FIG. 3 or FIG. 4, for example, in the buckle of FIG. 1, for example. It can be seen that sensing element 26 sends an electric impulse to the initiator at 28 for the release of pressurized gas when abnormal conditions, such as occur at the time of a collision, are sensed by the device, but that this action can occur only if the circuit closing means 29 is in its closed position, which only occurs when the restraint assembly is positioned about an individual and the laminated tongue locked in position in the buckle.

Alternatively or in addition to the use of the laminated tongue and buckle switch of this invention for activating a system for inflating an inflatable restraint is the use of the laminated tongue and buckle switch described with relation to FIGS. 1 through 4 used in association with seat belt webbing mounted in the vehicle for interrupting, for example, the circuit that will make a signal (such as light and/or buzzer) that the buckle and tongue are not fastened. In the use of the laminated tongue and buckle for this purpose, in one embodiment, as described with relation to FIG. 6, the tongue and buckle circuit closing means (when the laminated tongue is locked in position in the buckle) as described with relation to FIG. 1, for example, results in the opening of the circuit, as diagrammatically shown at 110 in FIG. 6 and thus interrupting of the circuit and between a source of energy 22, which may consist of a service battery, with the signal device 111, and preferably the ignition switch 112. It can be seen that upon locking of the laminated tongue in position in the buckle in this embodiment (either in addition to the activating of the inflatable means previously described or without the use of such inflator means or its activation) opens the switch 110 which no longer allows the circuit between battery 112 and the signal to be complete (when the ignition switch is turned on and therefore closed) so that the safety device will not operate when the buckle and laminated tongue circuit is complete.

While I have described the preferred embodiments of my invention, it will be understood that various modifications and changes can be made in the vehicle safety system described without departing from the spirit of this invention or the scope of the following claims.

I claim:

1. A switch comprising a buckle and tongue, said buckle having a latch bar mounted therein for locking the tongue in the buckle, said buckle further including a spring biased contact mounted therein contacting an end of the tongue when the tongue is locked in the buckle, said tongue being a unitary structure and including laminated electrically conductive portions separated by an insulating portion, said portions of the unitary tongue structure comprised of alternating laminations of electrically conductive and non-conductive material through its thickness, and said contact contacting said electrically conductive portions when the tongue is locked in the buckle, with an electrical circuit completed when the tongue is locked in the buckle through the electrically conductive portions of the tongue and the contact in the buckle.

2. A switch as claimed in claim 1, said electrically conductive portions of said tongue electrically connected to inflator means for an inflatable restraint so that the circuit activating inflation of said restraint is completed when the tongue is locked in the buckle.

3. The switch as claimed in claim 1, said electrically conductive portions connected to a circuit energizing a signal device for warning that the buckle and tongue are not latched, said tongue and buckle conductive portions completing a circuit to open the signal device circuit when the buckle and tongue are latched.

* * * * *